(12) United States Patent
Heroux (10) Patent No.: US 11,128,337 B2
(45) Date of Patent: *Sep. 21, 2021

(54) CASE WITH INTEGRAL STAND AND EXTENDABLE MEMBER FOR MOBILE DEVICES

(71) Applicant: Hip Innovations, LLC, Calabasas, CA (US)

(72) Inventor: Steve Heroux, Hidden Hills, CA (US)

(73) Assignee: HIP INNOVATIONS, LLC, Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,321

(22) Filed: Jan. 6, 2020

(65) Prior Publication Data
US 2021/0091817 A1    Mar. 25, 2021

Related U.S. Application Data

(63) Continuation-in-part of application No. 16/579,477, filed on Sep. 23, 2019.

(51) Int. Cl.
| | | |
|---|---|---|
| *H04B 1/3888* | (2015.01) | |
| *A45C 11/00* | (2006.01) | |
| *F16C 11/04* | (2006.01) | |
| *F16M 11/04* | (2006.01) | |
| *F16M 11/10* | (2006.01) | |
| *F16M 13/02* | (2006.01) | |

(52) U.S. Cl.
CPC ............ *H04B 1/3888* (2013.01); *A45C 11/00* (2013.01); *F16C 11/04* (2013.01); *F16M 11/041* (2013.01); *F16M 11/105* (2013.01); *F16M 13/022* (2013.01); *A45C 2011/002* (2013.01); *A45C 2200/15* (2013.01)

(58) Field of Classification Search
USPC ....................................... 455/575.1
See application file for complete search history.

(56) References Cited

U.S. PATENT DOCUMENTS

| | | | |
|---|---|---|---|
| D559,230 S | * | 1/2008 | Griffin .................. D14/217 |
| 7,845,612 B2 | | 12/2010 | Mase |
| 8,016,107 B2 | | 9/2011 | Emsky |
| | | (Continued) | |

FOREIGN PATENT DOCUMENTS

JP       2017158165       7/2017

*Primary Examiner* — Yuwen Pan
*Assistant Examiner* — Paul P Tran
(74) *Attorney, Agent, or Firm* — Cislo & Thomas, LLP (57) ABSTRACT

A case that may provide mobile devices with the ability to be propped up and held via an extendable member for viewing and using mobile devices. The present invention comprises a case that may have a proximate end, a distal end, a back surface, and a front surface. The case may also have a hinge that may be located on the proximate end of the case. The invention may have an extendable member with a first end and a second end, wherein the first end may be attached via the hinge. In some embodiments the case may have a back surface with a securing mechanism for attaching to an object. In some embodiments the case's extendable member may be configured to rotate about an axis defined by the hinge. Further, in some embodiments, the extendable member may be configured to stay in place at any single degree of rotation.

16 Claims, 12 Drawing Sheets

(56) References Cited

U.S. PATENT DOCUMENTS

| | | | |
|---|---|---|---|
| 8,651,529 B2* | 2/2014 | Yair | A47B 23/044 |
| | | | 281/33 |
| 9,301,584 B2 | 4/2016 | Butts | |
| D756,339 S | 5/2016 | Tussy | |
| 9,473,190 B1* | 10/2016 | Sandlofer | H04B 1/3888 |
| D771,030 S | 11/2016 | Tussy | |
| D780,166 S | 2/2017 | Lin | |
| D786,235 S | 5/2017 | Huotari et al. | |
| 9,677,702 B2 | 6/2017 | Kim | |
| 9,723,735 B1 | 8/2017 | Kim | |
| 9,912,368 B2 | 3/2018 | Kim | |
| 9,917,937 B1* | 3/2018 | Fathollahi | H04M 1/04 |
| 9,936,780 B2* | 4/2018 | Tu | H04B 1/3888 |
| 9,985,678 B1* | 5/2018 | Sumida | H04M 1/04 |
| 10,362,697 B2* | 7/2019 | Yuan | F16M 13/00 |
| 2007/0062089 A1* | 3/2007 | Homer | G06F 1/1626 |
| | | | 40/754 |
| 2012/0025039 A1* | 2/2012 | Segal | H04M 1/04 |
| | | | 248/188.6 |
| 2012/0182680 A1* | 7/2012 | Wetzel | F16M 11/105 |
| | | | 361/679.06 |
| 2012/0199501 A1 | 8/2012 | Le Gette | |
| 2013/0286623 A1 | 10/2013 | Slipy et al. | |
| 2015/0244408 A1 | 8/2015 | Chen | |
| 2016/0033074 A1* | 2/2016 | Drakos | F16M 13/02 |
| | | | 248/122.1 |
| 2016/0066453 A1 | 3/2016 | Quehl et al. | |
| 2016/0073749 A1 | 3/2016 | Lach | |
| 2016/0120297 A1 | 5/2016 | Senoff | |
| 2016/0183652 A1* | 6/2016 | Erlandsen Strange | H04M 1/04 |
| | | | 220/756 |
| 2016/0353867 A1 | 12/2016 | Due | |
| 2018/0041237 A1 | 2/2018 | Mody et al. | |
| 2018/0088445 A1 | 3/2018 | Michaud | |
| 2018/0220782 A1* | 8/2018 | Mody | A45F 5/00 |
| 2018/0248580 A1 | 8/2018 | Edman | |
| 2018/0332153 A1 | 11/2018 | Brown | |
| 2020/0063915 A1 | 2/2020 | Lederer | |

* cited by examiner

CASE WITH INTEGRAL STAND AND EXTENDABLE MEMBER FOR MOBILE DEVICES

CROSS-REFERENCE TO RELATED APPLICATION

This patent application is a continuation-in-part application of U.S. patent application Ser. No. 16/579,477, entitled "Attachment Stand and Extendable Member" filed Sep. 23, 2019, which is incorporated in its entirety here by this reference.

TECHNICAL FIELD

The present invention relates generally to a versatile device, and more particularly, to one that can be attached to a mobile device or case for mobile devices such as cell phones and used as grips, carriers, holders, stands, and the like.

BACKGROUND

Mobile devices such as cell phones and the like are often held in a person's hand, carried in a pocket, or stored in a bag. Often times when using a mobile device, users may need to hold the device at an extended position from their hand and also conduct some other sort of action to interact with the mobile device without losing control of the mobile device. At times, users may want to view the mobile device at an angle or at a distance so they may sit down and look at the front of the mobile device without having to hold the mobile device in their hand. The present invention makes these interactions with a mobile device significantly more feasible.

SUMMARY

Embodiments of the present invention are directed to a versatile device that may provide mobile devices, such as cell phones and the like, with the ability to be propped up and held by person via an extendable member for the purposes of both viewing and using mobile devices. An embodiment of the present invention comprises an extendable member hingedly connected to the base for pivotal movement toward and away from the base. In some embodiments the versatile device may have a back surface that utilizes a fastener for attaching the versatile device to an object such as a mobile device wherein the fastener may be at least one sidewall. In some embodiments the versatile device's extendable member may be configured to rotate about an axis defined by the hinge. Further, in some embodiments, the extendable member may be configured to stay in place at any single degree of rotation. In some embodiments, the axis of the hinge may be positioned perpendicular to a vertical orientation of a mobile device and parallel to a horizontal orientation of a mobile device.

The goals of such a device may be, for example, to utilize the versatile device to provide additional functionality to a mobile device such as creating a stand for viewing the mobile device, a handle for holding the mobile device in various positions, a hook for hanging the mobile device, and a ring for spinning or gaining control over the mobile device. As used here it is understood that mobile devices are intended to include cell phones, music on audio devices, GPS devices, tablets, e-readers, books, journals, planners, and various other devices.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention and claims therein.

Figure 1:
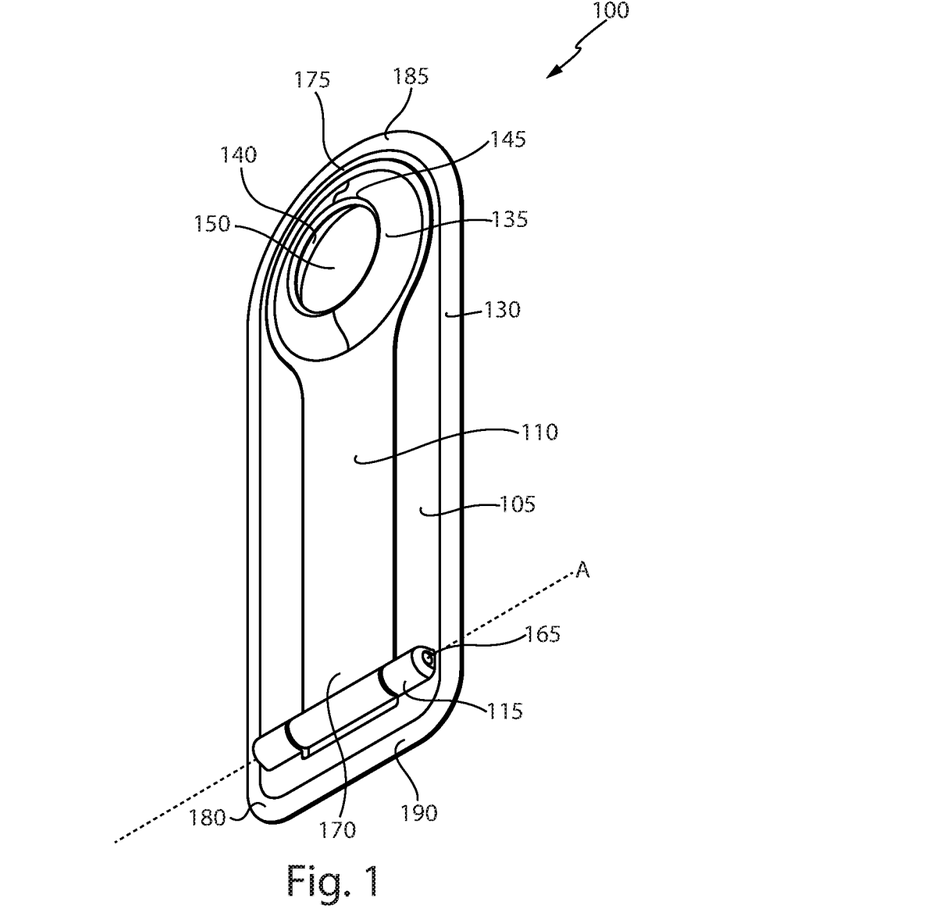
FIG. 1 shows a front perspective view of an embodiment of the present invention in a closed configuration.
Figure 9:
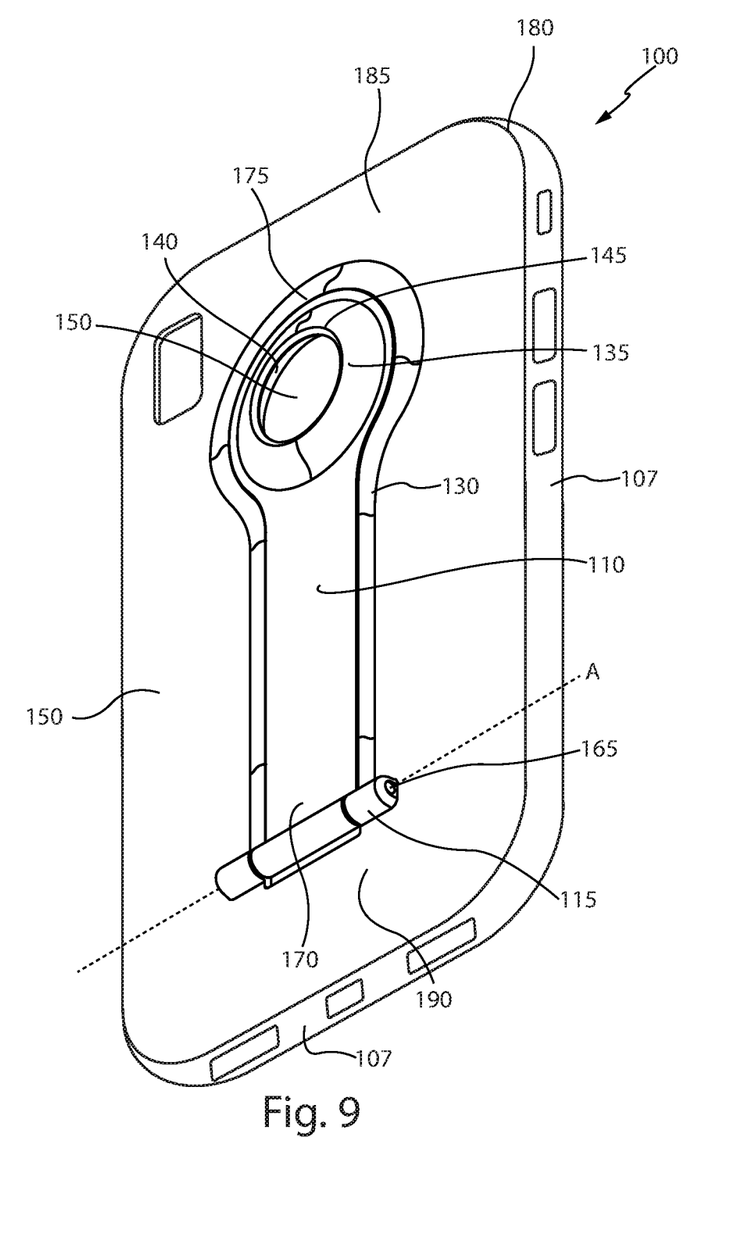
FIG. 9 shows a front perspective view of another embodiment in a closed configuration.

Referring to FIGS. 1 and 9, the versatile device 100 comprises a base 105, in some embodiments, the base 105 may be a case, such as a phone case, an extendable member 110, and a hinge 115 shown in the closed configuration. The versatile device 100 may be used in connection with various mobile devices for selected control on positioning of the mobile device. In some embodiments, the versatile device 100 may be in the closed configuration (as shown) where a user may be able to store a mobile device, with the versatile device 100 attached to the mobile device, in a pocket without snagging the pocket because the versatile device 100 preferably has smooth edges.

Figure 2:
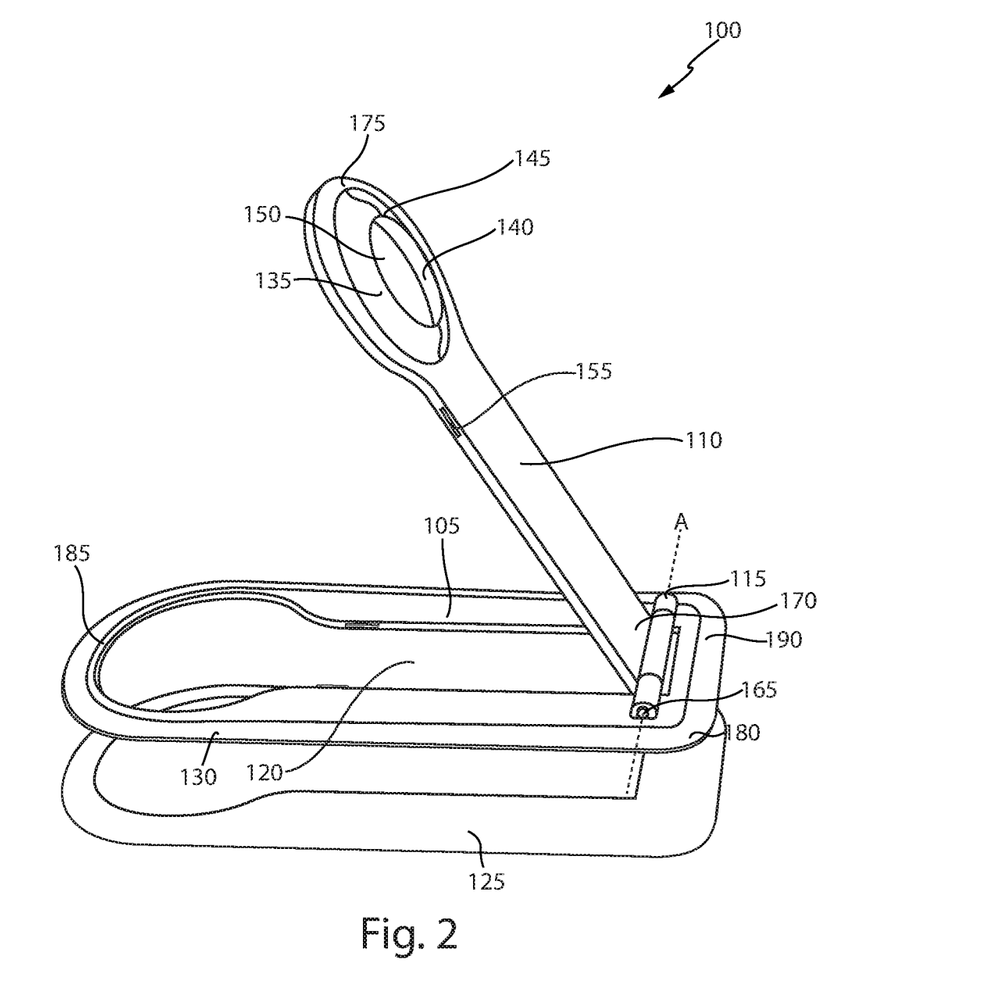
FIG. 2 shows an exploded perspective view of the embodiment shown in FIG. 1 in a deployed configuration.
Figure 10:
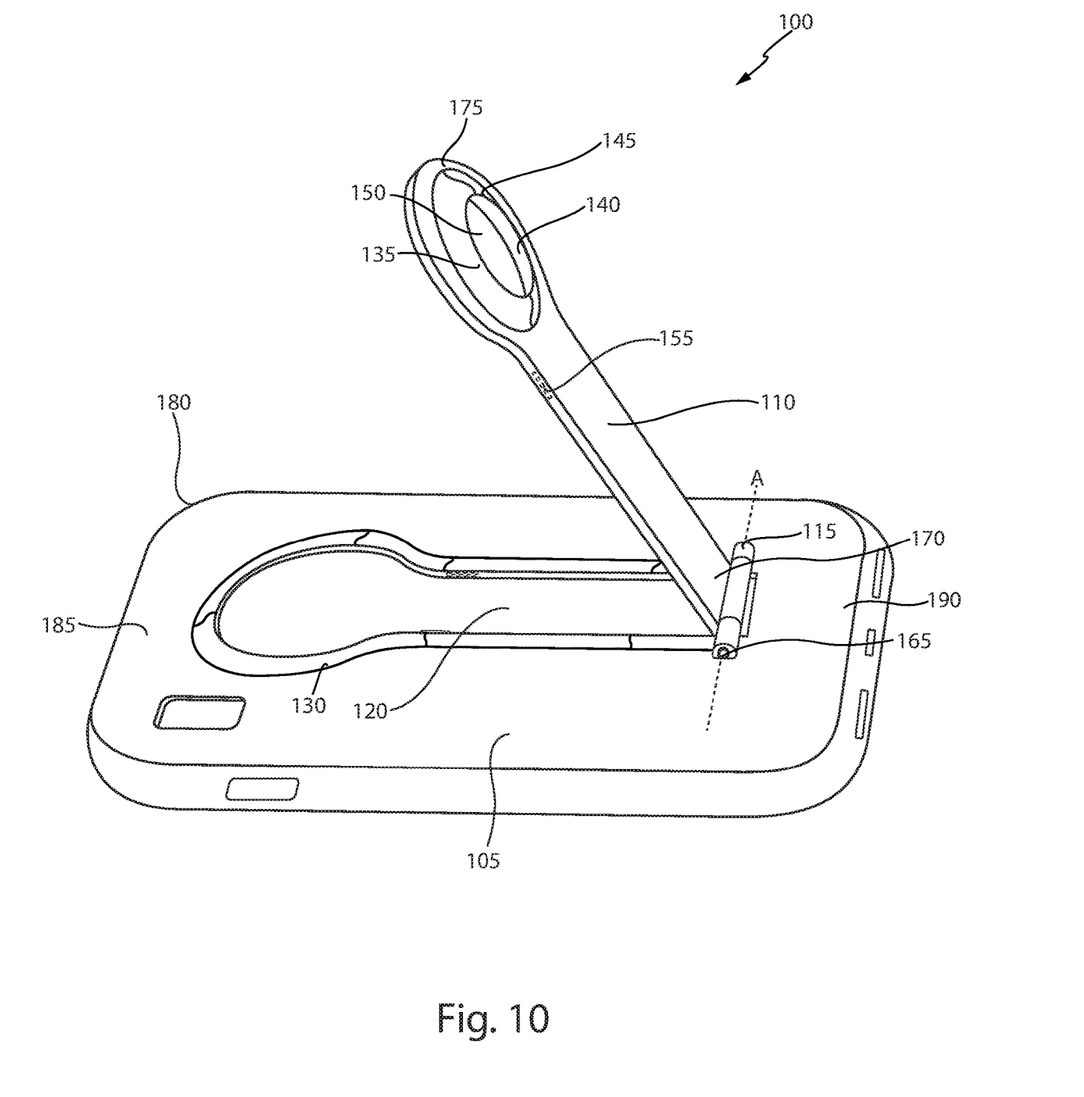
FIG. 10 shows a front perspective view of the embodiment shown in FIG. 9 in a deployed configuration.

In some embodiments, when the versatile device 100 is attached to a mobile device, the user may, for example, prop up the mobile device by extending an extendable member 110 of the versatile device 100 to various degrees of rotation where the extendable member 110 may be configured to stay in place at any single degree of rotation about an axis A defined by a hinge 115, as seen in FIGS. 2 and 10.

In some embodiments, when the versatile device 100 is attached to a mobile device, the user may, for example, grasp the extendable member 110 to take a picture, when the mobile device is a cell phone or the like, with the mobile device with more control than the user may have had without the versatile device 100 attached to the mobile device.

In some embodiments, when the versatile device 100 is attached to a mobile device, the user may, for example, fit a finger in an aperture 150 of the extendable member 110 to hold onto the mobile device, spin the mobile device, or pull the extendable member 110 to a different degree of rotation to form a different angle about an axis A defined by the hinge 115.

The Base

As can be seen in FIGS. 1, 2, 3, 4, 8, 9, 10, and 11 in some embodiments, the base 105 may be generally rectangular in shape. The outer perimeter of the base 105 may be straight or curved or a combination of both, such as in typical phone cases. The outer perimeter may also have radial corners 180. The outer perimeter of the case embodiment may have at least one sidewall 107.

Figure 4:
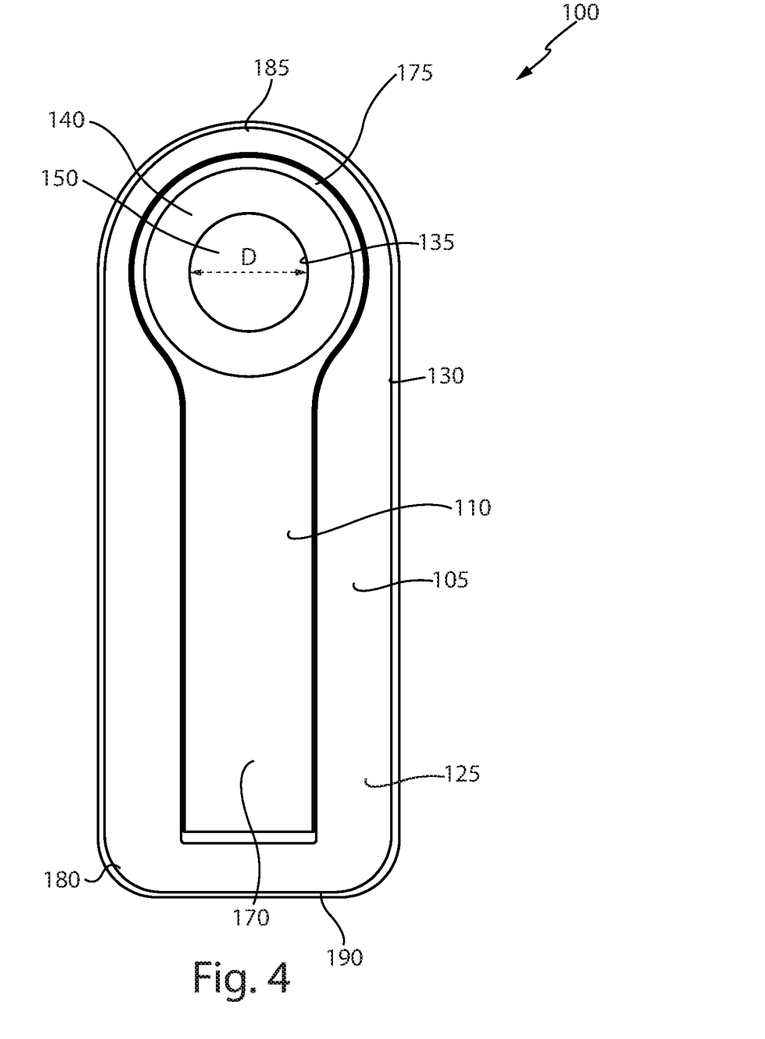
FIG. 4 shows a back view of the embodiment shown in FIG. 1.
Figure 5:
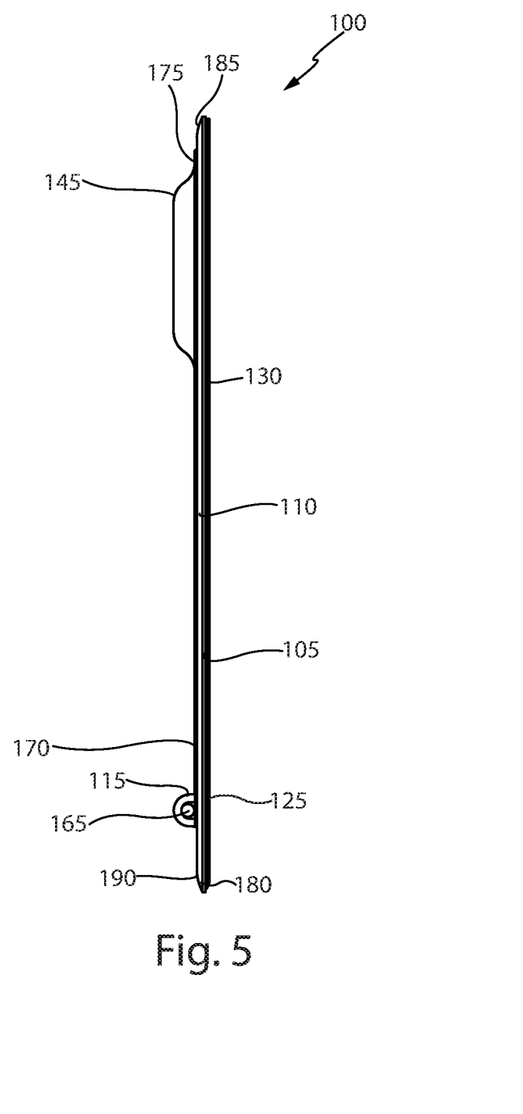
FIG. 5 shows a vertical side view of the embodiment shown in FIG. 4.
Figure 6:
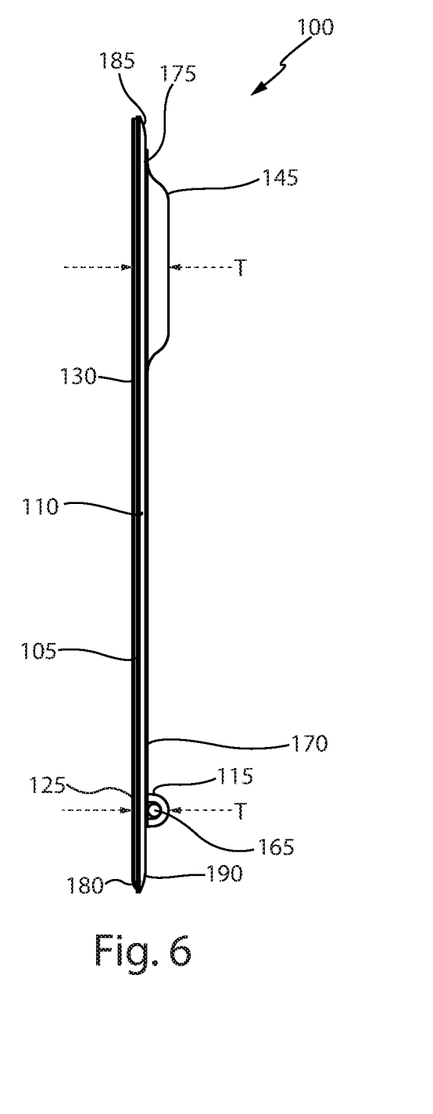
FIG. 6 shows an opposite vertical side view of the embodiment shown in FIG. 5.
Figure 7:
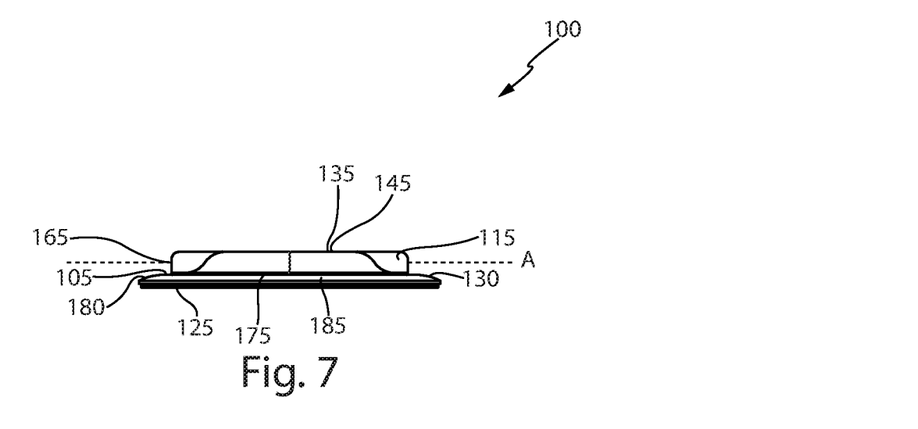
FIG. 7 shows a top view of the embodiment shown in FIG. 6.
Figure 8:
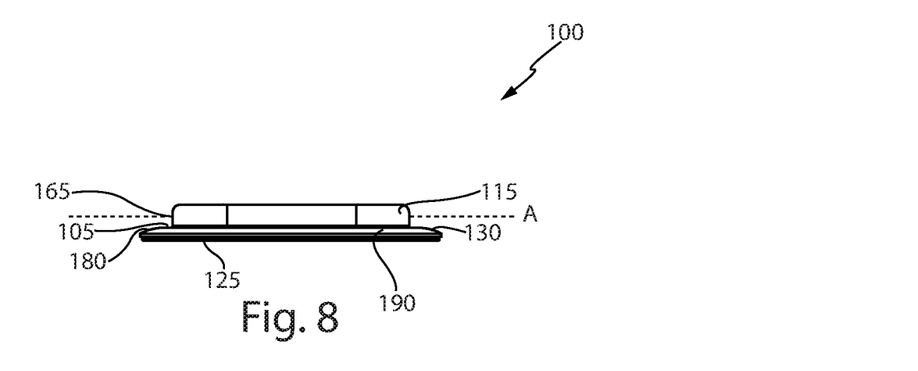
FIG. 8 shows a bottom view of the embodiment shown in FIG. 7.
Figure 12:
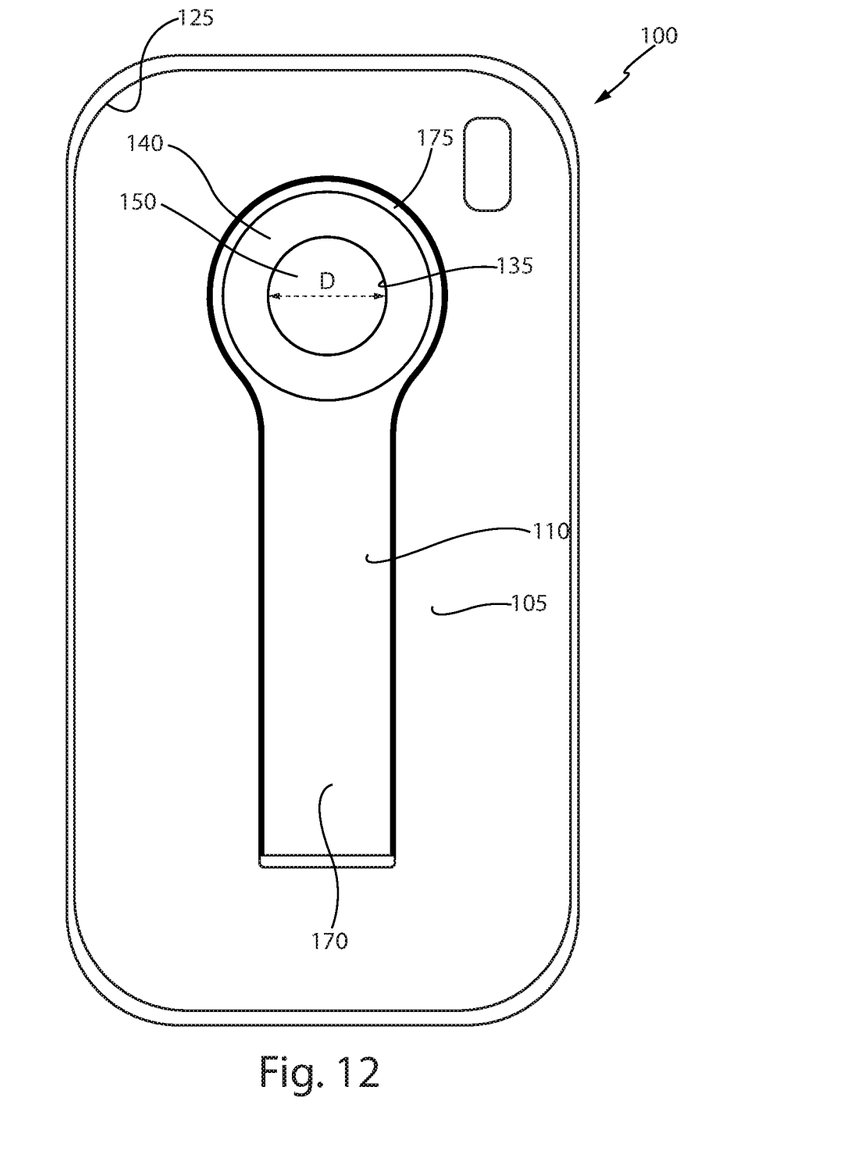
FIG. 12 shows a back view of the embodiment shown in FIG. 11 in the closed configuration.
Figure 13:
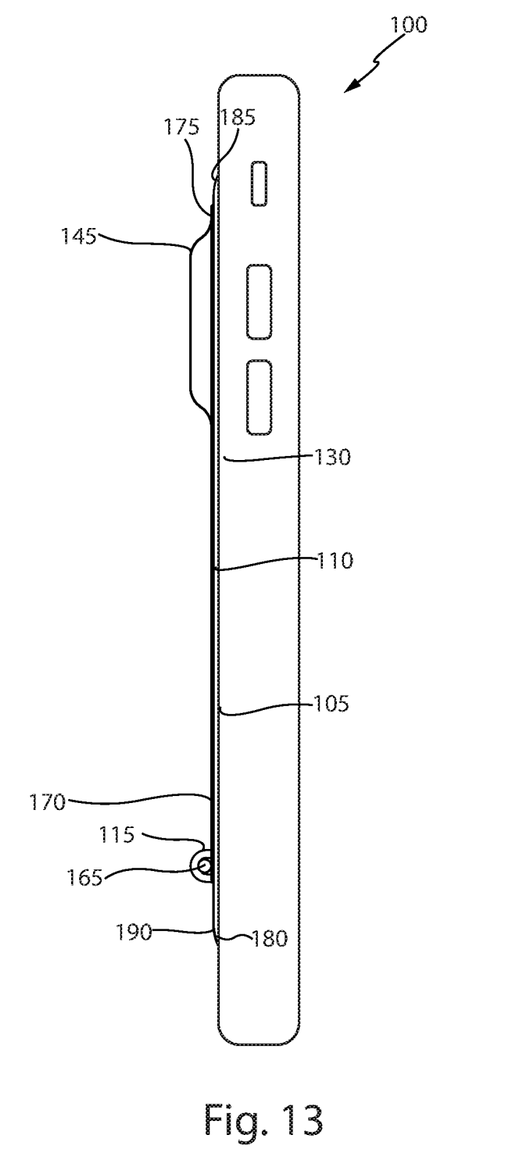
FIG. 13 shows a vertical side view of the embodiment shown in FIG. 12 in the closed configuration.
Figure 14:
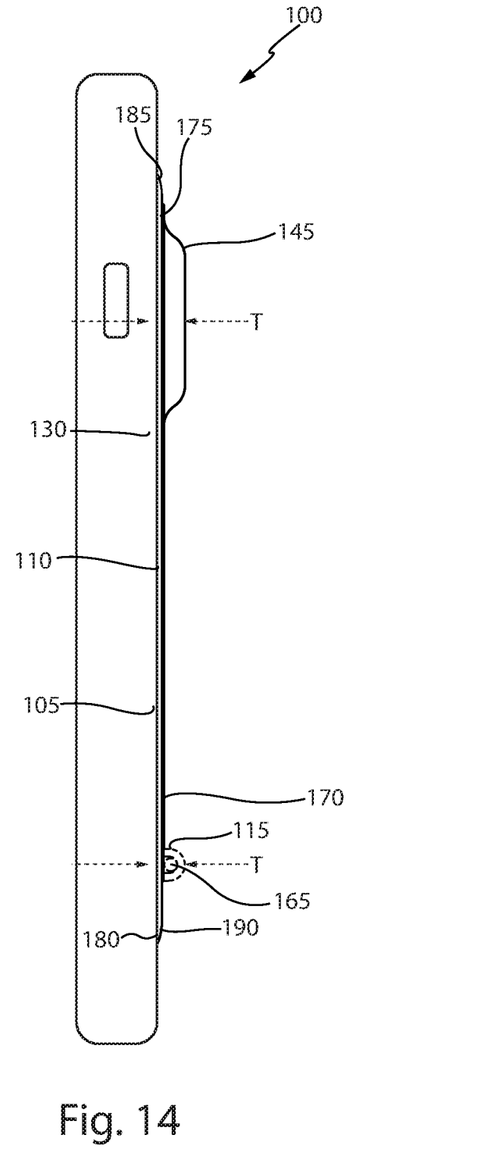
FIG. 14 shows the opposite vertical side view of the embodiment shown in FIG. 13 in the closed configuration.
Figure 15:
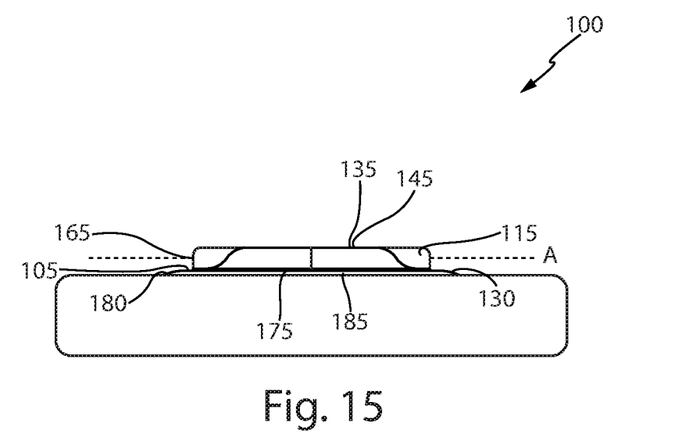
FIG. 15 shows a top view of the embodiment shown in FIG. 14 in the closed configuration.
Figure 16:
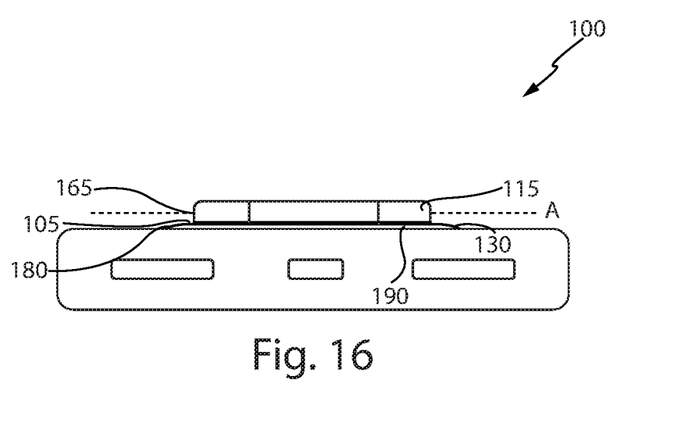
FIG. 16 shows a bottom view of the embodiment shown in FIG. 15 in the closed configuration.

The base 105 may comprise an opening 120, a fastener 125, and a beveled edge 130 along the majority of the outer perimeter of the opening 120. In embodiments where the base 105 functions as a case, the fastener 125 may be at least one side wall 107 that snugs on to a device, such as a phone. The opening 120 of the base 105 may be configured to receive the extendable member 110 within the opening 120. As seen in FIGS. 4 and 12, the fastener 125 that may be a part of the at least one sidewall 107 may be used to secure the versatile device 100 as a whole to a mobile device or various other mobile devices that may have the need to be stood upright or held in a better position for viewing, etc. The base 105 may comprise a bevel 130 that extends around the entirety or majority of the opening 120 to create a smooth edge that alleviates snagging on things such as a fabric pocket, inside a purse, pants, or the like.

In some embodiments, the base 105 may have a thickness of approximately 1 mm to 5 mm. The base 105 may be made of a variety of plastics, plexiglass, acrylic, wood, carbon fiber, or metals. In some embodiments, the base 105 may be coated with, for example, rubbers, plastics, or other various smoothly textured materials.

In some embodiments of the present invention the opening 120 may comprise a back so the opening 120 does not penetrate all the way through the base 105 but rather may be a carved out portion. Obviously, the extendable member 110, as well as opening 120 may take any configuration or shape and is configured to receive the extendable member 110.

The Extendable Member

In some embodiments the extendable member 110 may have a first end 170 and a second end 175 wherein the first end 170 may be attached to a hinge 115 that connects the extendable member 110 to the base 105. In general, the extendable member 110 has a lollipop shape.

Preferably, the extendable member 110, has a second end 175, that may comprise an elevated portion 135, defined by a recessed portion 140 on the opposite side, a lip 145, an aperture 150, and an engagement mechanism 155. The elevated portion 135 of the recessed portion 140 may mirror the shape of the elevated portion 135 on the opposite side of the extendable member 110. The structure of the elevated portion 135 and the recessed portion 140 may form the lip 145 of the extendable member 110 for the purposes of grasping and moving the extendable member 110 pivotally away from the base 105. The lip 145 of the extendable member 110 may surround the aperture 150 that is configured to fit a user's finger that may reposition the extendable member 110 from an end of the base 105. The extendable member 110 may have an engagement mechanism 155, mid-way through the thickness of the extendable member 110, for the purposes of holding the extendable member 110 in place within the opening 120 of the base 105, in this instance.

In a preferred embodiment, the first end 170 may, for example, be narrower than the second end 175. However, in some embodiments, the shape may have an evenly distributed width throughout the entirety of the longitude of the extendable member 110.

Figure 3:
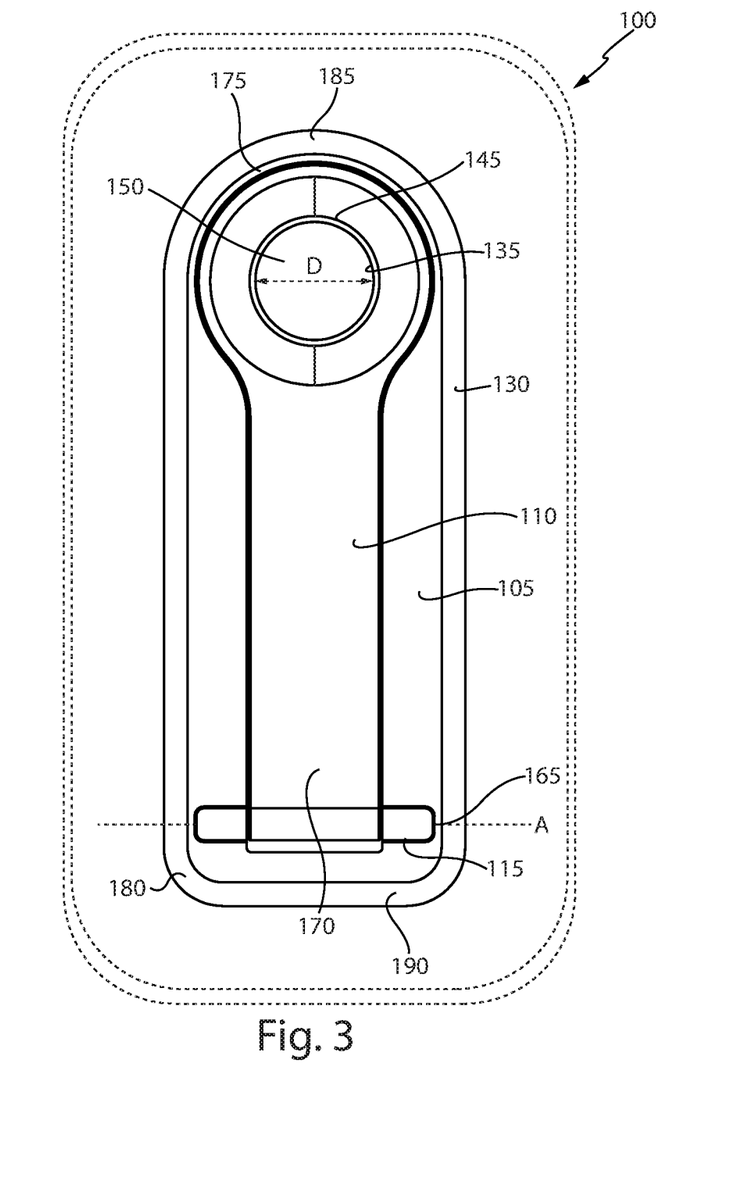
FIG. 3 shows a front view of another embodiment of the present invention.
Figure 11:
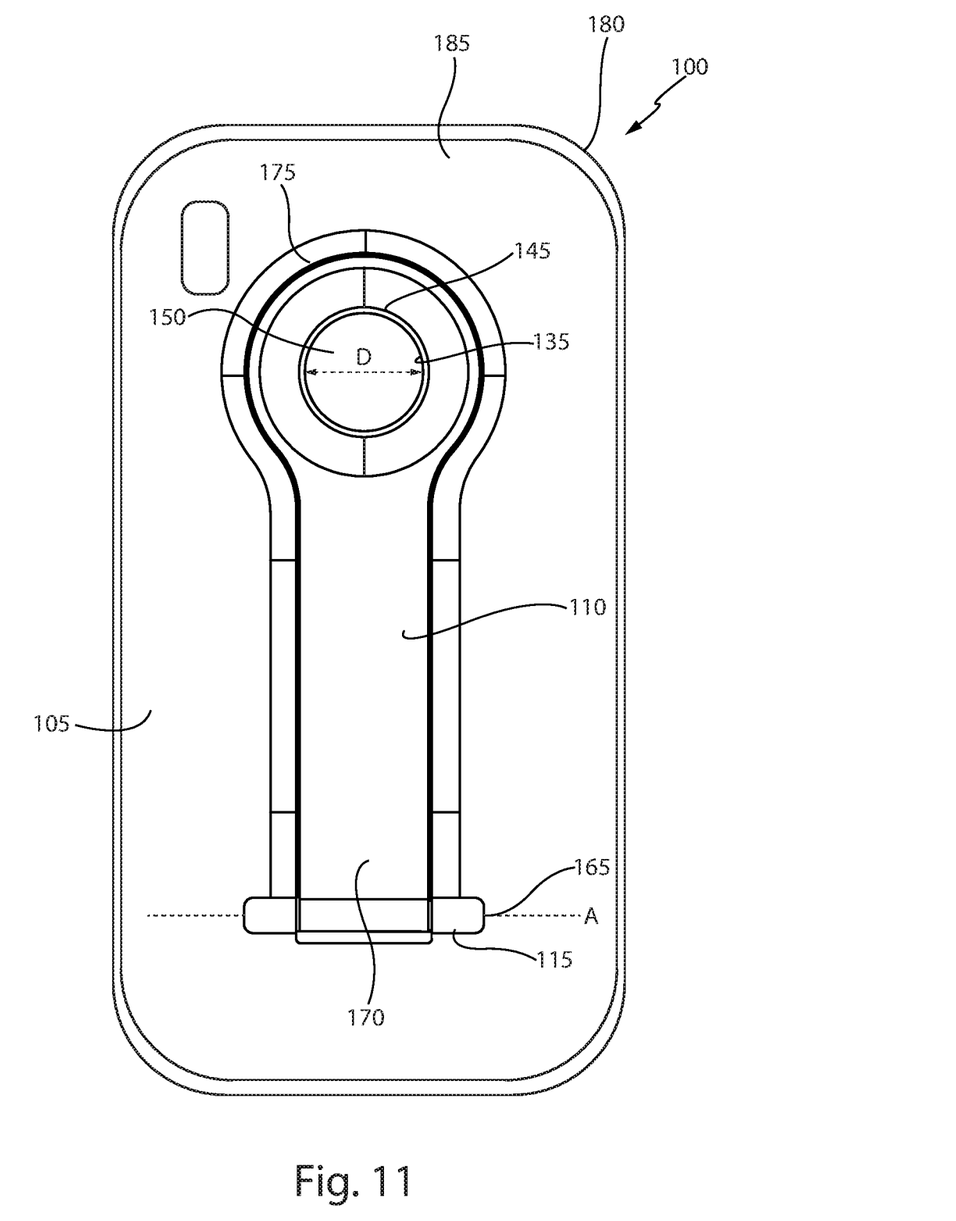
FIG. 11 shows a front view of the embodiment shown in FIG. 10 in the closed configuration.

In some embodiments, the second end 175 of the extendable member 110 may comprise an elevated portion 135 and a recessed portion 140 of which are the inverse shape of each other on opposing sides of the extendable member 110. The elevated portion 135 and the recessed portions 140 may form a lip 145 that surrounds an aperture 150 in the extendable member 110 configured to fit a finger. For example, the lip 145 that surrounds the aperture 150 may have a diameter D of approximately 10 mm to 40 mm, as shown in FIGS. 3 and 11. In some embodiments, the elevated portion 135 and recessed portion 140 may form a circle, oval, square, or various other shapes that enable a user to insert their finger into the aperture 150 and move the extendable member 110 pivotally away from the distal end 185 of the base 105 to form an angle with an axis A defined by the hinge 115.

In some embodiments the extendable member 110 may be made up of a substantially similar material as the base 105 such as, for example, a variety of plastics, plexiglass, acrylic, wood, carbon fiber, or metals. The elevated and recessed portions 140 may additionally comprise a metal ring to provide the shape of the aperture 150 on the second end 175. In some embodiments the extendable member 110 may be coated in a plastic or rubber type of material that provides an aesthetically pleasing look and feel to the product. The extendable member 110, for example, may be generally parallel with the base 105 and may fit within an opening 120 of the base 105 to form the closed configuration of the versatile device 100 as seen in FIGS. 1 and 9.

As can be seen in FIGS. 2 and 10, in some embodiments, the extendable member 110 may comprise an engagement mechanism 155. For example, there may be female inserts on both sides of the extendable member 110 that may be configured to snap into place with corresponding male portions that may be on the edge of the opening 120 of the base 105. The engagement mechanisms 155 may be on both sides of the extendable member 110 and opening 120 or a single edge of the extendable member 110 and the opening 120. In some embodiments, the engagement mechanism 155 of the extendable member 110 may, for example, a magnetic portion, hook and loop portion, or an adhesive.

The Hinge

The base 105 and extendable member 110 may be connected via a hinge 115 that, in some embodiments, may be located on a proximate end 190 of the base 105. The hinge 115 may be cylindrical in shape extending across the majority of the proximate end 190 of the base 105. The hinge 115 may comprise two portions on opposing sides of the opening 120 wherein a rod 165 may extend from one portion, through a hollow cylinder of the extendable member 110 to the other portion connecting the two portions and the extendable member 110 to form one seamless unit. In some embodiments, the axis A of the hinge 115 may be positioned perpendicular to a vertical orientation of a mobile device and parallel to a horizontal orientation of a mobile device.

The hinge 115 may define an axis A wherein the extendable member 110 may rotate when the second end 175 of the extendable member 110 is grasped and moved pivotally from the opening 120 of the base 105 about an axis A defined by the hinge 115. In some embodiments the hinge 115 may enable the extendable member 110 to stay in place at any degree of rotation away from the base 105 by utilizing friction between the hinge 115 and the extendable member 110. In some embodiments, the extendable member 110 may be held in place at any degree of rotation via a ratcheting mechanism that may enable the extendable member 110 to click into various degrees of rotation and lock into place.

In some embodiments, the hinge 115 may form a solid piece between the extendable member 110 and the base 105 wherein the hinge 115 may bend via a flexible material. In some embodiments, for example, the hinge 115 may be a snap in mechanism where extendable member 110 may rotate without any rod built into a hinge 115. In some embodiments the hinge 115 may utilize ball bearings to rotate the extendable member 110.

Closed Configuration

In some embodiments, the versatile device 100, in a closed configuration may have a thickness T of 2 mm to 10 mm and have smooth edges for the purposes of preventing snagging of the versatile device 100 on various external possessions that come into contact with the versatile device.

In some embodiments the versatile device 100 may have a thickness T of approximately 2 mm to 10 mm from the bottom of the adhesive of the base 105 to the top of the elevated portion 135 on the extendable member 110. In such an embodiment the top of the hinge 115 may extend to the same height from the base 105 as the top of the elevated portion 135 from the base 105. In an embodiment, for example, the versatile device 100 may be of a thickness T of 6.10 mm from the back surface of the base 105 to the top of the elevated portion 135. In some embodiments the versatile device 100 may be configured to have all smooth edges to prevent snagging with external matter when, for example, a user is sliding the versatile device 100 it into a pocket. This is particularly helpful when the versatile device 100 is attached to a mobile device and needs to be stored for transportation. Often times, attachable devices are configured in a way that they cause inconvenience due to size and structure. This is a significant benefit to some embodiments of the present invention where the versatile device 100 is configured in such a manner that it forms a seamless transition from the device it may be attached as if it is almost a part of the device itself.

Additional Embodiments

In some embodiments, the body of the versatile device 200 may be embedded within a case for a mobile device as can be seen in FIGS. 3 and 11. In such an embodiment the versatile device 200 may be attachable to the mobile device by existing as a case around some edges of the mobile device to secure the mobile device to the versatile device. In such embodiments, the case may vary in size dependent upon the size and shape of the mobile device that the versatile device 200 is intended to be attached to. In some embodiments, where the versatile device 200 is embedded within a case the base 205 may be adjustable to fit various sizes of mobile devices.

The present invention is a versatile device 100 that may be attachable to a number of mobile devices. In some embodiments the present invention may be attachable to various mobile devices via an adhesive portion that is sealed onto the back of the base 105 of the present versatile device. The base 105 may also use at least one sidewall 107 to secure the mobile device. Preferably, the fastener 125 that may be used to attach the versatile device 100 to mobile devices may utilize a number of methods such as hook and loop, magnetics, or other adhesives.

In use, the versatile device 100 may start in a closed configuration wherein the extendable member 110 is within the opening 120 of the base 105. In some embodiments, to lift the extendable member 110 from its closed configuration a user of the versatile device 100 may insert a finger into the aperture 150 on the second end 175 of the extendable member 110 and pull up on the lip 145 that is formed from the elevated portion 135 and recessed portion 140.

The user may, for example, pivotally pull the extendable member 110 away from the distal end 185 of the base 105 about an axis A defined by the hinge 115 forming an approximately 25-115 degree angle to prop a mobile device up in a landscape orientation. In some embodiments, a user of the versatile device 100 may decide to pull the extendable member 110 further to from the distal end 185 of the base 105 about an axis A defined by the hinge 115 forming an approximately 35-100 degree angle to prop a rectangular shaped mobile device up in a portrait orientation. In some embodiments, a user of the versatile device 100 may decide to pull the extendable member 110 even further to from the distal end 185 of the base 105 about an axis A defined by the hinge 115 forming an approximately 110-220 degree angle to use the extendable member 110 as an arm for grasping to hold a mobile device upward. At approximately 200 degrees as just described, and when used in connection with a mobile phone that comprises a camera, the extendable member 110 may be used as a selfie stick to enable a user to take better pictures.

The versatile device 100 may provide the ability to hold up a mobile device by utilizing an extendable member 110 that may be pulled out from an opening 120 of a base 105 that may also be a case by a user as described above. When the extendable member 110 is pulled away from the base 105, in some embodiments, friction between the extendable member 110 and the hinge 115 may be utilized to hold the extendable member 110 in place at a specific degree of rotation from an axis A defined by the hinge 115. In some embodiments, the hinge 115 and extendable member 110 may utilize other forms of securing the extendable member 110 in place such as a ratcheting mechanism. In some embodiments, to hold extendable member 110 in place, user of the versatile device 100 may merely need to pull the extendable member 110 away from the body as described above and let go of the extendable member 110 at the place in which they would like the extendable member 110 to remain and the versatile device 100 may be held in place as intended by the user.

In addition to propping up the mobile device, the extendable member 110 may be further used as an arm for the user to hold with their hand. For example, the arm may be pulled away from the body to form an angle defined by the hinge 115 of approximately 200 degrees. In some embodiments, by holding the extendable member 110 at this angle, a user may be able to use the extendable member 110 as what is known as a selfie stick or to take pictures more easily with a mobile device.

In some embodiments the versatile device 100 may be used to enable a user to have further control over the mobile device. For example, if the user pulls the extendable member 110 away from the body as described above, the versatile device 100 may provide the user the ability to insert their finger into the aperture 150 of the extendable member 110 and grip the extendable member 110 in numerous ways to control the mobile device. The user may, for example, also spin the mobile device by inserting their finger into the aperture 150 of the extendable member 110 and swinging the extendable member 110 about an axis A defined by the user's finger. In some embodiments, the versatile device 100 may enable a user to assure that the mobile device is not dropped by enabling the user to hook a finger through the aperture 150 in the extendable member 110 and in the case the mobile device may be bumped or normally dropped, the user may retain control of the mobile device because they would have hooked their finger through the aperture 150 in the extendable member 110 of the versatile device.

Further, in some embodiments, the versatile device 100 may be used to hang a mobile device on a hook for display on an approximately vertical or vertical surface without sliding. This may be beneficial when a user walks into their home, they may be able to hang their mobile device on a hook in a known location so they do not lose the mobile device. Additionally, for example, the mobile device could be hung in a location where people may want to view the mobile device. For example, a user could attach the versatile device 100 to a tablet and may then hang the table on a wall where the user could watch a movie.

In some embodiments, a user may have all of the functionality as described above without the disadvantages of using a bulky attachment that significantly modifies the shape and functionality of the mobile device. When a user is finished using the versatile device 100 for one of its intended purposes, the user may simply close the versatile device 100 by pushing the extendable member 110 into the opening 120 of the base 105. When the versatile device 100 is in its closed configuration the mobile device that the versatile device 100 may be attached to can be used in its normal form because the versatile device 100 may be designed with a thin configuration that is smooth on the edges enabling the user to use the mobile device free of encumbrance from the versatile device.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A case to hold a mobile device, comprising:
   a base having a proximate end, a distal end, a back surface, a front surface, an opening, and at least one side wall;
   a hinge located on the proximate end of the case;
   an extendable member with a narrow end and a wide end wherein the narrow end is attached to the hinge;
   an elevated portion located on the wide end;
   a recessed portion located on the opposite side of the elevated portion;
   wherein the opening of the case extends all the way through the case;
   wherein the extendable member is of a same shape and depth as the opening so as to allow the extendable member to fit within the opening;
   an engagement mechanism within the opening to hold the extendable member in place within the opening;
   wherein a majority of the extendable member is configured to lay flush with the front surface of the case when inserted into the opening;
   wherein the extendable member is configured to utilize a fixed state of friction between the extendable member and the hinge and to rotate from a closed configuration to a deployed configuration up to 220 degrees about an axis defined by the hinge;
   wherein the extendable member is configured to stay in place at any single degree of rotation;
   wherein the elevated portion on the wide end of the extendable member forms a lip;
   whereby the back surface of the case and the at least one side wall are configured to hold the mobile device in place,
   wherein the extendable member, when in the deployed configuration, provides a stand for the mobile device in either of a vertical and horizontal configuration without the need to be attached to another object;
   wherein the extendable member also doubles as a handle for the mobile device;
   wherein the extendable member is configured to be in a generally flat profile when in the closed configuration with the case; and
   wherein a center of the elevated portion defines an aperture configured to enable a user of the case to reach inside the aperture to pull the extendable member from the opening about the axis defined by the hinge.

2. The case of claim 1, wherein the case comprises four side walls each being perpendicular to the orientation of the back surface of the case.

3. The case of claim 2, wherein each of the four side walls and the case are interconnected.

4. The case of claim 3, wherein the case has a beveled edge that surrounds the majority of the opening.

5. The case of claim 4, wherein the elevated portion and the recessed portion form a circle.

6. The case of claim 5, wherein a thickness of the case, measured from the back surface to the lip of the elevated portion, in the closed configuration, is less than 10 mm.

7. The case of claim 6, wherein the four side walls are configured to attach to the mobile device using a securing mechanism.

8. A case, comprising:
   a base having a proximate end, a distal end, a back surface, a front surface and at least one side wall;
   a hinge located at the proximate end of the case; and
   an extendable member with a first end and a second end, wherein the first end is attached to the hinge;
   wherein the at least one side wall of the case is configured to hold an object in place;
   wherein the extendable member is configured to rotate between a closed configuration and a deployed configuration about an axis defined by the hinge;
   wherein the extendable member is configured with a fixed state of friction between the extendable member and the hinge to stay in place at any single degree of rotation; and
   wherein the second end is configured to have an aperture configured to enable a user of the case to reach inside the aperture to pull the extendable member from the opening about the axis defined by the hinge.

9. The case of claim 8, wherein the front surface of the case comprises an opening.

10. The case of claim 9, wherein the extendable member is configured to fit within the opening.

11. The case of claim 10, wherein a majority of the extendable member is configured to lie flush with the front surface of the case in the closed configuration.

12. The case of claim 11, wherein the aperture of the second end is configured to comprise an elevated portion.

13. The case of claim 12, wherein the elevated portion forms a lip that is configured to enable a user of the case to remove the second end of the extendable member from the front surface of the case and away from the distal end of the case.

14. The case of claim 13, wherein the case, in a closed configuration, has a thickness that measures from 1 mm to 10 mm from the back surface to the lip of the elevated portion.

15. The case of claim 14, wherein the back surface of the case comprises a securing mechanism to attach to the object.

16. The case of claim 15, wherein the axis of the hinge is positioned perpendicular to a vertical orientation of the mobile device and parallel to a horizontal orientation of the mobile device.

* * * * *